July 11, 1933.  S. McINTIRE  1,917,536
THRESHING MACHINE
Filed Dec. 17, 1930  4 Sheets-Sheet 1
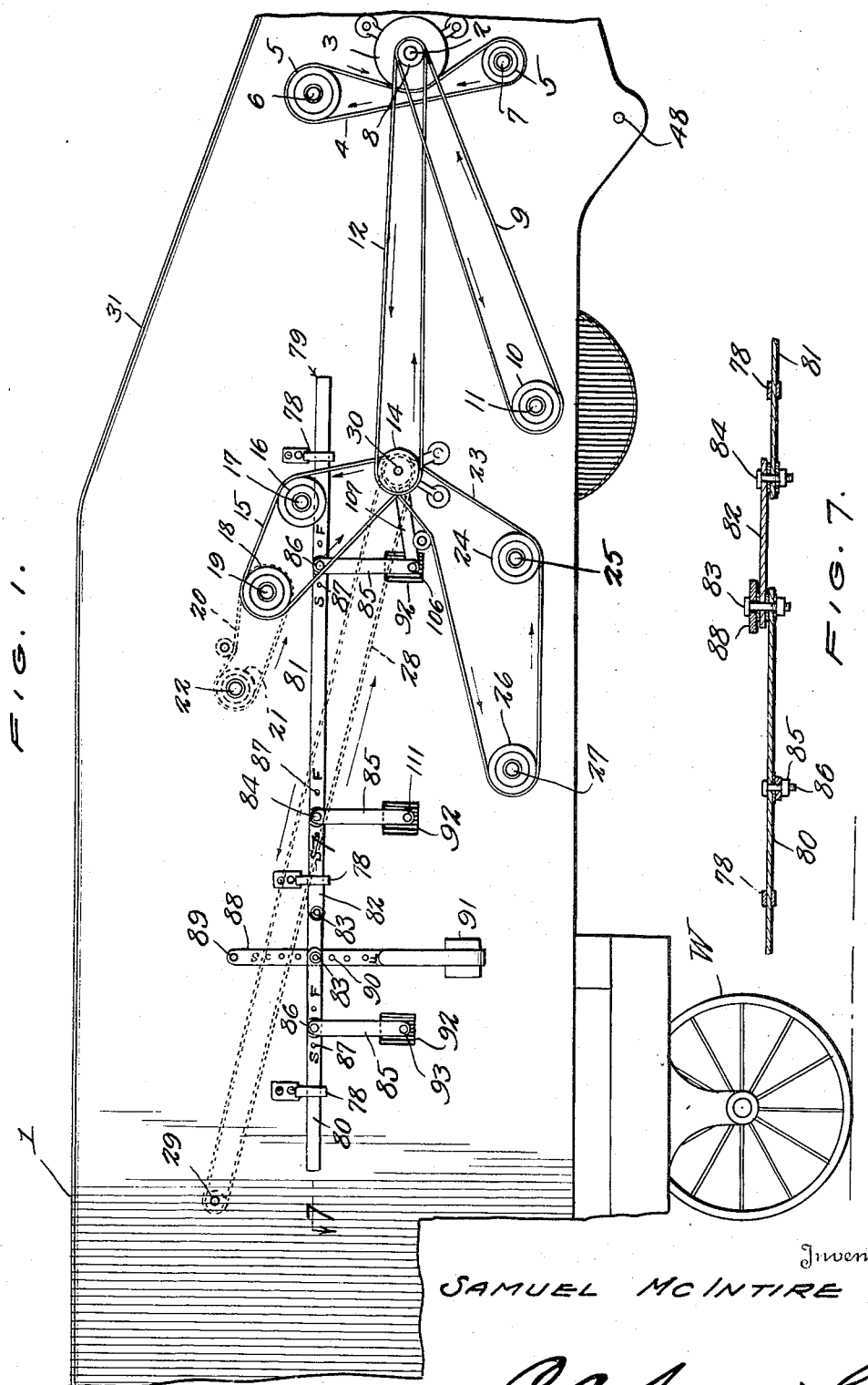
Inventor
SAMUEL McINTIRE
By CASnow&Co.
Attorneys.

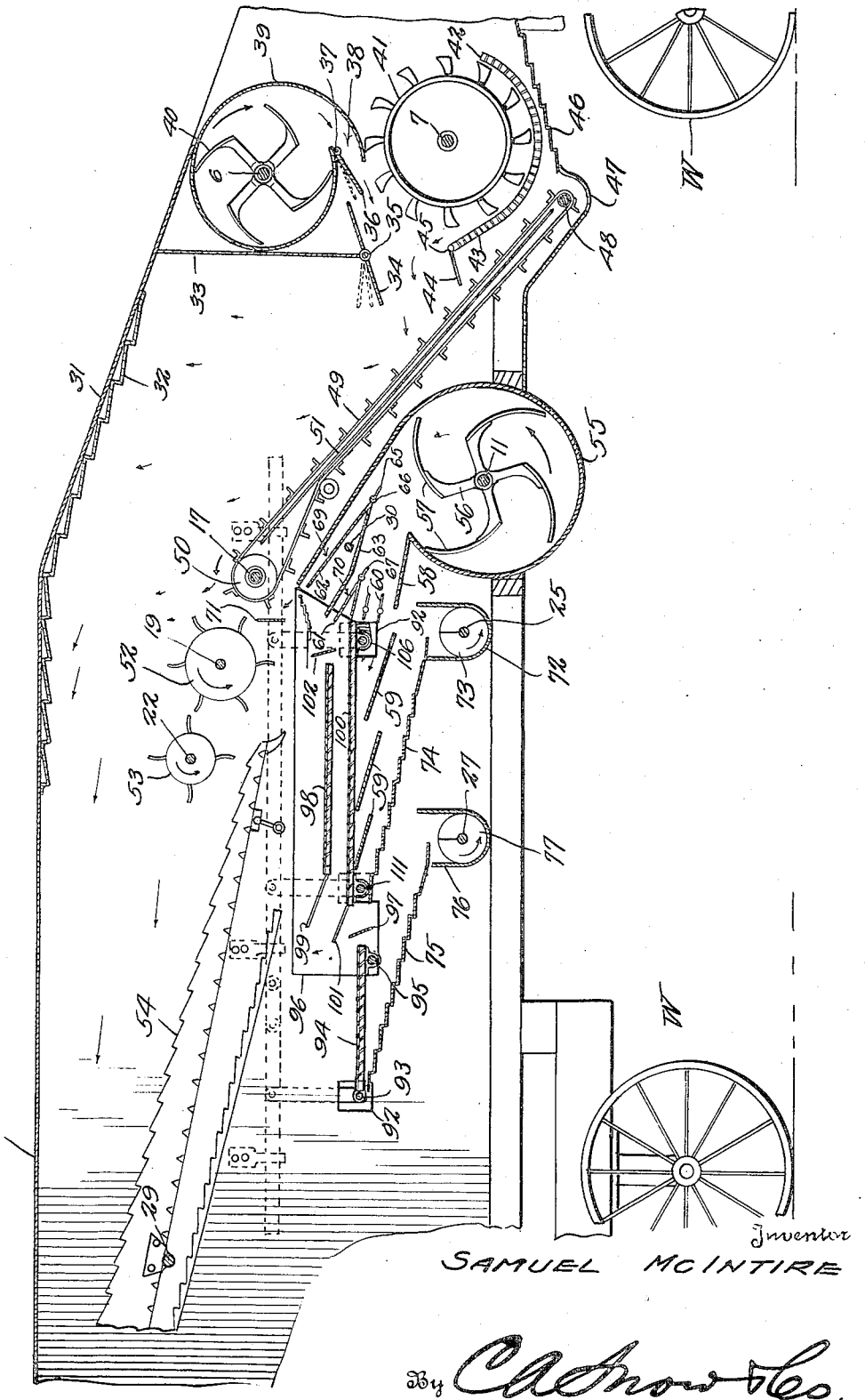

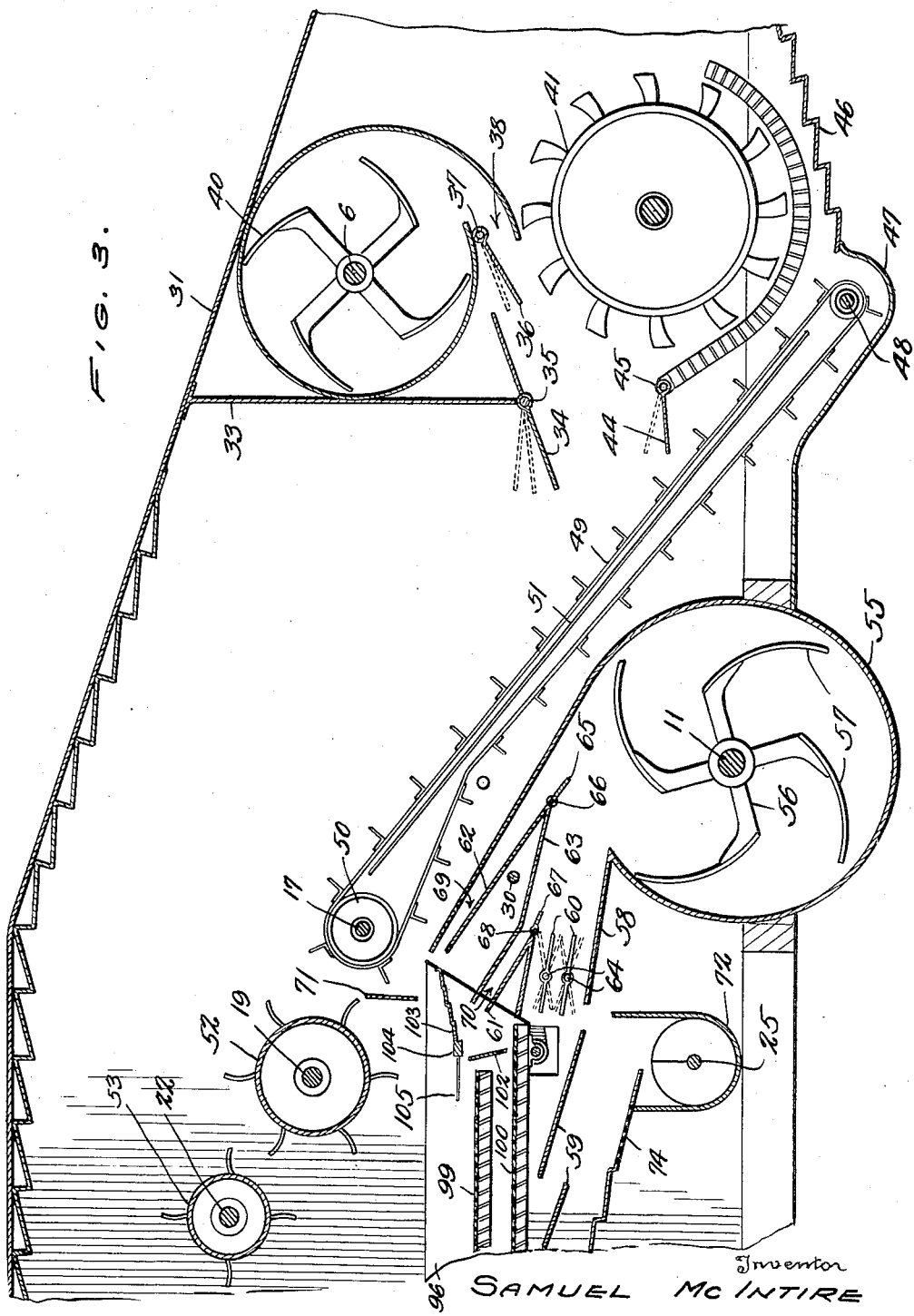

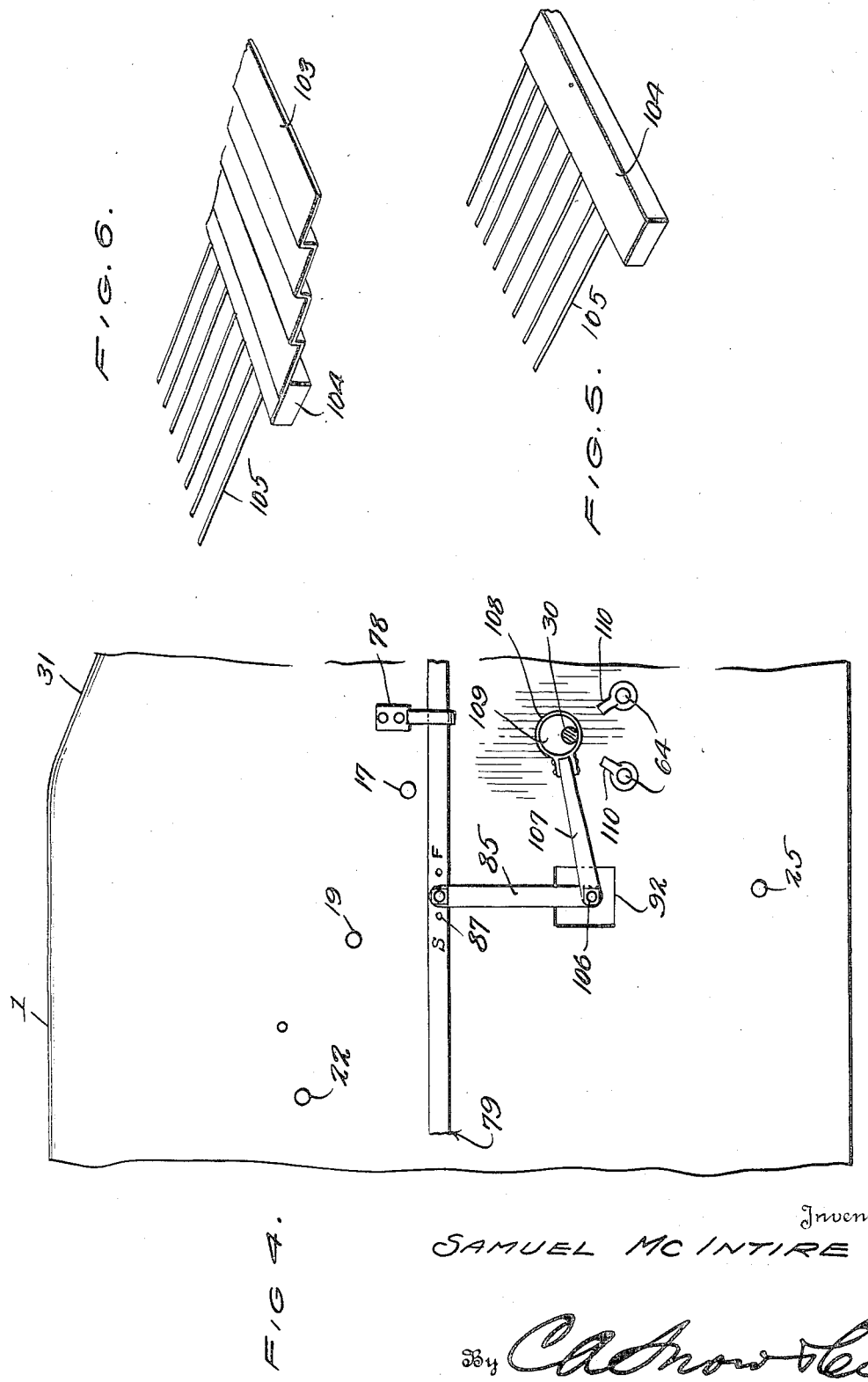

Patented July 11, 1933

1,917,536

UNITED STATES PATENT OFFICE

SAMUEL McINTIRE, OF NEWTON, KANSAS

THRESHING MACHINE

Application filed December 17, 1930. Serial No. 503,076.

This invention aims to provide a threshing machine which will dispose of the straw in a peculiarly effective manner, the grain being saved, and the device being so constructed that it will be made to operate properly whether going up hill or down hill.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 1 shows in side elevation, a device constructed in accordance with the invention, parts being broken away;

Figure 2 is a vertical longitudinal section parts being broken away;

Figure 3 is an enlarged vertical section, parts being broken away;

Figure 4 is an elevation showing a portion of the adjusting means for the riddles, and attendant parts;

Figures 5 and 6 are perspective views, showing portions of one of the platforms;

Figure 7 is a section taken approximately on the line 7—7 of Figure 1.

The device forming the subject matter of this application comprises the usual housing 1, carried on wheels W.

The drives will be traced out first. Referring to Figure 1, it will be seen that a first shaft 2 is mounted for rotation in the housing 1 and is driven in any suitable way. On the end of the first shaft 2 there is a pulley 3 which engages the forward run of a substantially vertical belt 4 engaged around pulleys 5 on a second shaft 6 and on third shaft 7, which are journaled in the housing 1. The shafts 6 and 7 are located a little behind the first shaft 2, the shaft 6 being disposed above the shaft 2, and the shaft 7 being disposed below the shaft 2, the shaft 2 carrying a pulley 8 about which is engaged a downwardly and rearwardly extended belt 9, cooperating with the pulley 10 on a fourth shaft 11 supported for rotation in the housing 1.

The pulley 8 on the first shaft 2 drives a substantially horizontal belt 12 engaged with a pulley 14 on a fifth shaft 30 journaled for rotation in the housing 1 and located behind and above the fourth shaft 11. The pulley 14 drives an upwardly and rearwardly extended belt 15 engaged with a pulley 16 on a sixth shaft 17 mounted to rotate in the housing 1.

The belt 15 is engaged with a pulley 18 on a seventh shaft 19 journaled in the housing 1. The shaft 19 drives a rearwardly and upwardly extended belt 20 which may be located on the opposite side of the machine from the belt 15. The belt 20 is engaged around a pulley 21 on an eighth shaft 22 supported for rotation in the housing 1.

A belt 23 is downwardly and rearwardly extended, and the belt is operated by the pulley 14 on the shaft 30. The belt 23 drives a pulley 24 on a ninth shaft 25 supported for rotation in the housing 1. The shaft 25 is located behind the shaft 11 and a trifle above the said shaft. The belt 23 drives a pulley 26 on a tenth shaft 27 journaled in the housing 1 and located behind the shaft 25. A belt 28 is located on the opposite side of the machine from the belts 15 and 23 and drives an eleventh shaft 29 supported for rotation in the upper rear portion of the housing 1.

The drives require little or no explanation, but it may be stated that the pulley 3 is driven by the shaft 2, the pulley 3 operating the belt 4, and the belt 4 rotating the shafts 6 and 7 by way of the pulleys 5. The belt 9 is driven by the pulley 8 on the shaft 2, and rotates the shaft 11 by way of the pulley 10. The belt 12 drives the pulley 14 and rotates the shaft 30. From the shaft 30 rotation is imparted to the belt 15 and the belt 15 drives the shafts 17 and 19. The shaft 22 is driven from the shaft 19 by the belt 20. The belt 23 drives the shaft 25 by way of the pulley 24, and drives the shaft 27 by way of the pulley 26. From the shaft 30, rotation is imparted to the shaft 29 through the instrumentality of the belt 28.

The top of the housing 1 is forwardly and downwardly inclined at its forward end, as shown at 31. There are corrugations 32 on the inclined portion 31 of the top of the housing 1, and on the adjacent horizontal part of the top of the housing. A vertical partition 33 extends downwardly from the inclined portion 31 of the top of the housing, and is located adjacent to the forward end of the corrugations 32.

A valve 34, under the control of an operator, is pivotally mounted, as shown at 35, at the lower end of the partition 33. At the forward end of the valve 34 there is a gate 36, which is under the control of an operator, like the valve 34. The gate 36 is pivoted at 37, at its forward end, to one end of a spiral casing 39 located in the housing 1. The casing 39 has a rearwardly extended and downwardly inclined outlet 38, and the gate 36 is located above, and forms the upper wall, of the outlet 38. A fan blower 40 is located in the casing 39 and is driven by the shaft 6.

Below the outlet 38 of the fan casing 39 is disposed a cylinder 41 which is operated by the shaft 7. The cylinder 41 cooperates with a concave 42 fixed in the housing 1 and located below the cylinder. The concave 42 has a straight, long, upwardly inclined rear end 43 to which a gate 44 is pivoted at 45, the gate 44 being under the control of an operator. The gate 44 is located beneath the rear end of the valve 34.

The concave 42 is placed above a stepped bottom 46 carried by the housing 1 and leading to a trough 47 in which is journaled for rotation, a shaft 48 driven by any common instrumentality (not shown). The shaft 48 carries an upwardly and rearwardly inclined conveyor belt 49 engaged with a cylindrical pulley 50 on the sixth shaft 17. The conveyor belt 49 passes around an upwardly and rearwardly inclined platform 51 which is imperforate, the platform 51 being supported by the housing 1.

A toothed cylinder or picker 52 is carried by the shaft 19. A toothed cylinder 53 is carried by the shaft 22. The shafts 17, 19 and 22 are located substantially in a common plane, which is upwardly and rearwardly inclined. The toothed cylinder 53 is located above the forward end of the straw carrier 54, the straw carrier being operated by the eleventh shaft 29. The straw carrier need not be described in detail because it may be of any common construction well known in the art.

A casing 55 is located in the bottom portion of the housing 1, beneath the inner end of the belt conveyor 49. A fan blower 56 is carried by the shaft 11 and operates in the casing 55. The fan blower 56 has curved blades 57. The fan blower casing 55 is supplied with a rearwardly extended, upwardly inclined outlet tube 58. Fixed deflectors 59 are carried by the housing 1 and are located behind the lower wall of the outlet tube 58 of the blower casing 55. The deflectors 59 are upwardly and rearwardly inclined, as shown in Figure 2 of the drawings. Dampers 60 are disposed one above the other, and are placed in the outlet 58, above the lower wall of the outlet, and at the rear end of the lower wall of the outlet. The dampers 60 are pivotally mounted intermediate the ends, and are under the control of an operator, as shown in Figure 4, the shafts of the dampers 60 being marked by the numeral 64, and suitable means (Figure 4) being provided, whereby the shafts 64 and the dampers 60 may be governed by an operator. The showing of Figure 4, at 110, will illustrate how any of the various valves, gates, and dampers, which are said to be under the control of an operator, may be operated.

In the outlet tube 58 of the blower casing 55 is located a V-shaped deflector 61 having its apex forwardly disposed. A second deflector 62 is located in the outlet tube 58, above the deflector 61. The second deflector 62 has a V-shaped, forwardly extended end 63, which projects forwardly, considerably beyond the forward end of the deflector 61. At the end of the deflector 62 is a movable deflector 65, which is pivotally mounted which is shown at 66, the deflector 65 being under the control of an operator. At the apex of the deflector 61 is a forwardly extended, adjustable deflector 67, which is pivotally mounted as shown at 68, the deflector 67 being under the control of an operator. The top of a second deflector 62, and the upper part of the outlet tube 58 for the blower casing 55 form an upper, reduced throat 69. The lower portion of the second deflector 62, and the upper wall of the first deflector 61 form a lower throat 70. A substantially vertical fixed deflector 71 is mounted in the casing 61 at the upper end of the upper wall of the outlet tube 58 of the blower casing 55, and extends upwardly between the toothed cylinder 52 and the pulley 50 which carries the conveyor belt 49.

A transverse trough 72 is carried by the housing 1 and is located immediately to the rear of the fan casing 55. In the trough 72, there operates a worm conveyor 73, which may be driven by the shaft 25. A stepped, downwardly and forwardly inclined chute 74 is carried by the housing 1 and leads to the trough 72 in which the worm conveyor 73 operates. A second chute board 75, which is stepped and downwardly and forwardly inclined, is carried by the housing 1 and extends below the rear end of the chute 74. The chute board 75 leads to a trough 76, disposed transversely of the housing 1. A worm conveyor 77 operates in the trough 76 and is operated by the shaft 27.

Referring especially to Figures 4, 1 and 7 of the drawings, it will be seen that guides 78 are mounted on each side of the casing 1 and are located substantially in a horizontal line. In each set of guides 78, there operates a carrier 79 which is a composite structure. The carrier 79 is made up of a rear slide bar 80, a forward slide bar 81, and a link 82 located between the slide bars. Pivot elements 83 and 84 connect the rear and forward ends of the link 82, respectively, with the forward end of the slide bar 80, and with the rear end of the slide bar 81.

Substantially vertical hangers 85 are connected at their upper ends by pivot elements 86 with the slide bar 80 and the slide bar 81 and by the pivot element 84 with the link 82 and the slide bar 81. The silde bar 80 the link 82 and the slide bar 81 have a plurality of holes 87 for the pivot elements 86 and 84, the said holes being plainly marked, so that an operator need make no mistake in carrying out the adjustments hereinafter described.

The numeral 88 marks a substantially vertical pendulum, hung at its upper end, as shown at 89, on the casing 1, to swing in a vertical plane, substantially parallel to the line of advance of the machine. The pendulum 88 is provided intermediate its ends with a plurality of marked holes 90 for the receipt of the pivot element 83. On the lower end of the pendulum 88, a weight 91 is secured.

The side walls of the casing 1 are supplied with holes 92 located on each side of the machine, and the structure shown in Figure 1 and hereinbefore described, as respecting the hangers 85, is located at each side of the machine.

The lower end of the rearmost hanger 85 is pivoted at 93 to the rear end of a screen 94 disposed above the chute board 75. The forward end of the screen 94 is pivoted at 95, by means of a shaft or otherwise, to a frame 96 located in the casing 1. The intermediate links 85 are pivoted through the holes 92, as shown at 111, to the frame 96. The forward links 85 carry, at their lower ends, a shaft 106, which is located at the forward end of the frame 96. A deflector 97 is mounted on the frame 96 at the forward end of the screen 94, and is upwardly and rearwardly inclined.

An upper screen 98 is carried by the frame 96 and has rearwardly and upwardly extended fingers 99 at its rear end. A lower screen 100 is carried by the frame 96, below the screen 98, and is supplied at its rear end with upwardly and rearwardly inclined fingers 101. A deflector 102 is carried by the frame 96 and is located at the forward end of the upper screen 98. The deflector 102 has a slight rearward and backward inclination, and is disposed in the path of the throat 70. A platform 103, which is stepped, is carried by the frame 96 and has at its rear end, a beam 104, carrying rearwardly extending fingers 105 which project above the deflector 102. The platform or deflector 103 is located in front of the throat 69.

The shaft 106 is connected to pitmans 107, carrying, each, a strap 108, the straps 108 being engaged around eccentrics 109 on the shaft 30.

The grain is fed into the forward end of the machine in the usual way, and is carried over the concave 42 by the cylinder 41. Both the grain and the straw are carried upwardly and rearwardly by the conveyor belt 49. The blast of air proceeding from the blower 40 goes through the outlet 38, under the control of the gate 36, and under the control of the valve 34. The blast of air proceeding from the blower 40 causes the straw to be carried upwardly, as shown by the arrows in Figure 2, the straw being deposited on the straw carrier 54. The straw, of course, is carried along by the toothed cylinders 52 and 53. The blast of air from the fan blower 56, proceeding through the throat 69, strikes the deflector 71, and is carried upwardly, in front of the toothed cylinder 52, the straw being thereby spread, opened out, and distributed, as it is carried rearwardly. Any grain which may fall from the straw at this time, goes downwardly on the platform 103, and passes through the fingers 105, on the upper screen 98. At this point it is to be noted, that there is a blast of air through the throat 70 which is directed by the deflector 102 against the material on the fingers 105.

The grain carried upwardly by the belt 49 is deposited on the platform 103, and moves through the fingers 105, upon the upper screen 98. There is a blast of air, also, from the outlet tube 58 of the casing 51, through the screens 100 and 98, under the direction of the deflectors 59, and small trash is carried over the fingers 99 and 101, upon the screen 94, where the grain receives a final riddling, the grain which passes through the screen 94 falling on the chute board 75 and being returned to the trough 76, from which it is carried away by the conveyor 77. The grain which finds its way on the board 74 is returned to the trough 72 and is carried away by the worm conveyor 73. The function of the deflector 97 is to direct the air upwardly through the fingers 101 and 99, as the air moves backwardly, above the chute board 74.

When the machine moves down hill, the natural tendency of the screens 98 and 100 is to incline down hill also, and when the machine moves up hill, the natural tendency of the screens 98 and 100 is to incline downwardly and rearwardly, and discharge the grain too fast to the rear. This tendency is corrected by the action of the pendulum 88 and the weight 89. It is obvious, that as the machine is inclined with respect to the horizontal, the pendulum 88 will swing with respect to the vertical, the carriers 79 moving in the guides 78, and the position of the hangers 85 with respect to the eccentrics 109 being changed, and the motion of the screens 98 and 100 being so altered that if the machine is down hill, with its forward end lowermost, the rearward movement of the grain on the screens 98 and 100 will be enhanced; whereas, if the machine is moving up hill, with its forward end raised, the rearward movement of the grain on the screens 98 and 100 will be retarded, and the grain will not move rearwardly too fast.

The function of the pendulum 88 is to adjust the position of the hangers 85 with respect to the operating means shown at 109 in Figure 4, and it has been found in practice, that the successful operation of the screens 98 and 100 depends more upon the position of the hangers 85 with respect to the operating means than upon any mere matter of raising and lowering the screens. The position of the screens 98 and 100 is not changed materially with respect to the deflectors with which they coact, as the machine moves up hill or down hill.

The machine is so constructed that it does away with beaters, jumping racks, grain pans and other extra attachments that require labor and attention in the operation and the upkeep. A current of wind is created, that carries the straw and chaff to the top of the machine, as shown by the arrows, thereby keeping the straw thin as it moves rearwardly, and various attachments, heretofore used to handle the straw and chaff are dispensed with. There is ample space at the top of the machine for the blast of air to carry the dust and chaff above the straw and out of the machine, the straw thus being kept loose and light, so that the grain can fall out of it, to the means provided for cleaning the grain. One of the most difficult points in combine harvesting and threshing is to get the straw and grain dry enough so that the grain can be separated from the straw, and have the grain sufficiently dry to preserve in bins, and go upon the market without spraying the grain. The machine forming the subject matter of this application will produce the results above alluded to.

The invention provides means for keeping the straw light and thoroughly separated, as hereinbefore explained, and as a consequence, less work is thrown on the cleaning means for the grain than is the case with many machines. At the same time, the grain is thoroughly removed from the chaff and straw, before the chaff and straw moves out of the rear end of the machine, and waste of grain is cut down to a minimum. The machine is light in construction, owing to the fact that many parts heretofore found necessary may be omitted, and the machine may be drawn or propelled by any suitable means, over the field, with the expenditure of little power. The flying grain is checked at various parts of the machine without resorting to power driven devices for that purpose, and the advantages of this feature are obvious to any person skilled in the art.

Having thus described the invention, what is claimed is:

1. In a threshing machine, a concave, a cylinder rotatable above the concave, an upwardly and rearwardly inclined conveyor receiving material from the concave, means for discharging an air blast clear of the top of the cylinder, close to the upper, rear edge of the concave, and against the conveyor, said means comprising an outlet mouth disposed to the rear of the cylinder and close to the conveyor, the space between the outlet mouth and the conveyor being open and unencumbered, the conveyor having an upward and rearward inclination which approaches the vertical sufficiently to bring the place where the air blast from the outlet mouth impinges the conveyor close to the upper, rear edge of the concave so that the chaff travelling over said edge of the concave will be moved upwardly across the outlet mouth by the action of the conveyor as distinguished from the action of the cylinder, the inclination of the conveyor being sufficient to create an angle of blast incidence and an angle of blast deflection which will blow the chaff upwardly by the blast deflected from the conveyor before the blast has proceeded far enough to lose any appreciable amount of its force, a vertical deflector at the rear end of the conveyor, a picker journaled behind the deflector and located closely adjacent thereto, and means for directing a second blast of air against the deflector, the space above the deflector being open so that the second blast of air will engage the deflected blast at a place spaced from the place where the deflected blast departs from the conveyor, and deaden the first blast of air enough to cause the grain that has been elevated from the conveyor by the deflected first blast of air to drop between the deflector and the end of the conveyor, the deflected blast of air carrying the chaff on to the picker.

2. In a threshing machine, a housing, a frame in the housing, a forward screen carried by the frame, a rear screen having its forward end pivoted to the frame, means for directing material from the forward screen to the rear screen, guides on the housing, a rear slide bar mounted in one of the guides, a forward slide bar mounted in another of the guides, a link located between the slide bars, a first pivot element connecting the rear end of the link with the forward end of the rear slide bar, a second pivot element connecting the forward end of the link with the rear end of the forward slide bar, the link and the forward slide bar having longitudinally spaced means for the reception of the second pivot element, forward, intermediate and rear hangers, the rear hanger being pivotally connected at its lower end to the rear end of the rear screen, the intermediate and forward hangers being pivotally connected at their lower end to the frame, the upper end of the intermediate hanger being carried by the second pivot element; means for connecting the rear hanger to the rear slide bar and means for connecting the forward hanger to the forward slide bar, in each instance for adjustment longitudinally of the said slide bars, a pendulum pivoted to the housing for swinging movement in a plane parallel to the direction of advance of the machine, a weight on the lower end of the pendulum, means for connecting the first pivot element to the pendulum at adjusted points longitudinally of the pendulum, and means for imparting reciprocation to the frame.

In testimony that I claim the foregoing as my own, I have hereto affixed my signature.

SAMUEL McINTIRE.